Dec. 4, 1962 J. F. WALLIS 3,066,692
BLENDING CONTROL APPARATUS
Filed Sept. 7, 1961
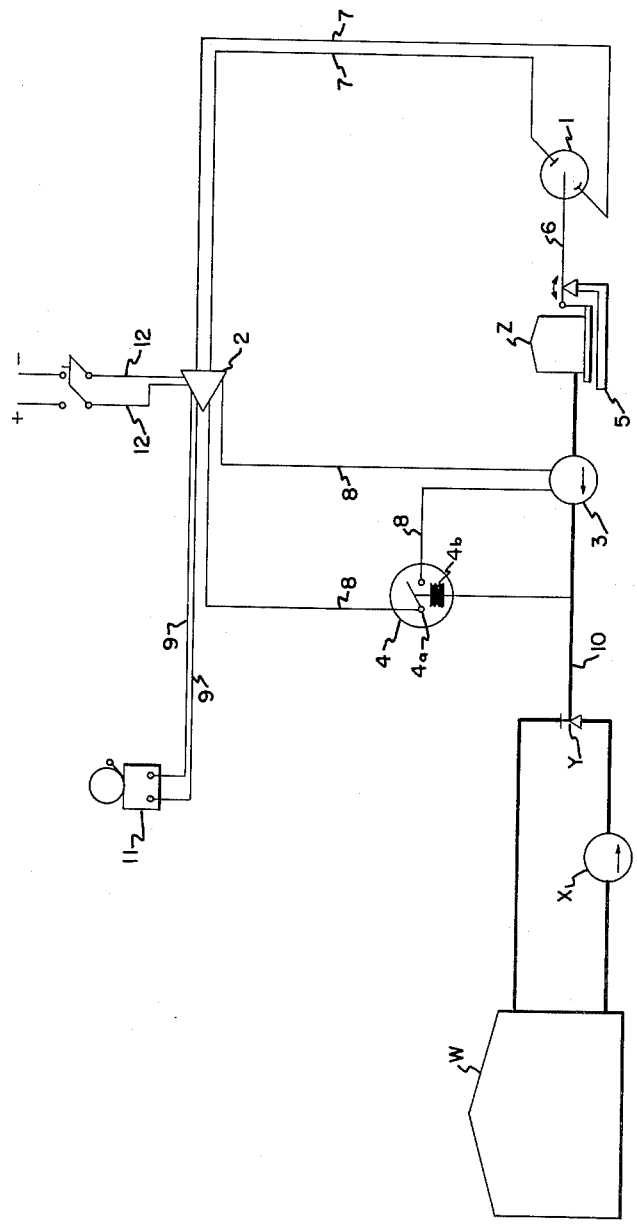

United States Patent Office 3,066,692
Patented Dec. 4, 1962

3,066,692
BLENDING CONTROL APPARATUS
John F. Wallis, Chicago, Ill., assignor to Ethyl Corporation, New York, N.Y., a corporation of Delaware
Filed Sept. 7, 1961, Ser. No. 136,660
3 Claims. (Cl. 137—408)

This invention relates to apparatus for blending fluids. More specifically, this invention relates to apparatus for automatically controlling the blending of a relatively small amount of one fluid in a proportionally large amount of a second fluid. Even more specifically, this invention in its most preferred embodiment relates to apparatus for the automatic blending, incorporating "fail-safe" operation, of a liquid fuel additive in a motor fuel.

Present-day motor fuels quite often contain as many as eight and more different types of fuel additives. Such additives constitute a relatively small proportion of the total volume of any given motor fuel. For example, the antiknock compounds, such as tetraethyl lead, are a principal type of fuel additive. A gasoline for automotive use usually contains about 3 milliliters of tetraethyl lead per gallon. Another principal class of fuel additive are antioxidant compounds, such as 2,4-ditertiarybutylphenol. Oxidation inhibitors are usually used in concentrations of less than 0.01% by weight. The addition and blending of certain types of fuel additives with a motor fuel are complicated by the fact that the fuel additives cannot be mixed together prior to their addition to the motor fuel because they are not compatible in their concentrated forms. Hence, such fuel additives must be added on a separate and individual basis to the motor fuel which requires duplication of operation. Furthermore, in blending operations such as described herein, it is desirable to add the fuel additive at a relatively slow rate both for accuracy and for assurance of proper blending. It is apparent that the duplication of these operations is extremely costly.

Due to the inherent limitations and difficulties of blending a fuel additive in a motor fuel, the practice in the art has been to conduct such operations under manual control. This practice has continued through the years as blending operations have become more complicated. While the problem has been relieved to some extent by automation, it is still customary to manually control the rate and amount of addition of a fuel additive to a motor fuel. Besides failing to provide consistent accuracy and safety of operation, the necessity of detailed manual control limits the effective utilization of manpower and fails to achieve a desired degree of accuracy. Even more important, in view of the degree of care required in handling present-day fuel additives, manual control of blending operations still leaves something to be desired in not eliminating entirely the risk of human error.

A need has therefore existed for improved techniques for blending a fuel additive with a motor fuel. Hence an object of the present invention is to provide a novel apparatus for the accurate and safe blending of present-day fuel additives in motor fuels. A more specific object is to provide novel means for the controlled safe addition of a fuel additive to a motor fuel. A more specific object is to provide novel means for automatically measuring and adding a desired amount of fuel additive to a motor fuel while incorporating fail-safe operation. Other objects will be apparent hereinafter.

A typical simplified system as employed in the art today for the blending of a fuel additive with a motor fuel generally comprises a blending and storage tank containing a source of motor fuel, a circulation pump, and an eductor. These components are usually arranged in piping relationship such that the pump takes suction on the tank and discharges the contents thereof through the eductor. This creates a negative pressure in the eductor which, in turn, takes suction on a source of fuel additive which is intimately mixed with the motor fuel in the eductor as it flows therethrough. Positioned between the eductor and the source of fuel additive is a suitable valve whereby the rate of addition and desired quantity of fuel additive may be selectively controlled.

This invention comprises novel means to supplement a basic system as discussed in the preceding paragraph so as to achieve a more desirable and efficient mode of operation. This objective is accomplished by providing automatic means for the continuous measurement of fuel additive being blended and interruption of such operations upon realization of a desired blend ratio. This eliminates the many problems mentioned above that are inherent in a detailed manually controlled system. A greater degree of safety is provided by this invention by a unique arrangement of its components resulting in a fail-safe method of operation. By "fail-safe" is meant the automatically safe shutdown of the whole system upon any interruption of blending operations. With the trend in the art today toward "tailor made" fuels, that is, fuels containing a diversity of expensive additives in exacting amounts, this invention provides many desirable improvements.

A full understanding and appreciation of the invention may be readily obtained from the following description of the attached drawing.

The drawing represents a general schematic diagram of a blending system showing basic components thereof in combination with the means of a specific embodiment of this invention.

Referring to the drawing, a basic system for blending fluids would include a blending and storage tank W, a circulation pump X to take suction on the tank and discharge the contents of the tank through an eductor Y. The eductor would in turn take suction on a source of additive fluid Z to be blended with the contents of the tank W.

This invention constitutes an improvement to such a system and in a preferred embodiment includes as its basic components: a fluid measuring means; a sensing unit; an amplifier and relay unit; a fluid control valve; and a vacuum actuated safety switch.

The measuring means 5 is positioned relative to the source of fuel additive Z to allow the continuous measurement of the amount of additive being consumed and blended with the motor fuel. The basis of measurement of the fuel additive is a matter of choice since it may be performed by weight or by volume. It is apparent to one skilled in the art that there are many different types of measuring apparatus which may fulfill this function. A common type of volume measuring apparatus would be a float in combination with level indicating means. A preferred embodiment of this invention comprises a weight measuring means such as the scale 5, shown in the drawing. The scale 5 further comprises a counterweight 6 mounted so as to move in an arcuate path.

A sensing unit 1 is mounted in a working relationship with the measuring means 5 so as to detect the completion of addition of fuel additive. Here as elsewhere, the type of means employed to accomplish this objective is a matter of choice while still keeping within the spirit of the invention. The drawing depicts a photo electric cell 1 which is mounted in the arcuate path of movement of the counterweight 6 such that its light beam will be interrupted by the counterweight at a predetermined selective point lying along the path of movement of the counterweight. In this embodiment, such selectivity may be accomplished by making either one of the elements 1 or 6 adjustable relative to the other. An amplifier and relay means 2 is provided to detect the interruption of the photo electric cell 1 as transmitted via circuit means 7.

A fluid control valve 3 is provided in the piping 10, which connects the source of fuel additive Z with the eductor Y. A preferred type of fluid control valve is an electrically operated solenoid globe type valve requiring power to open. Interruption of the electric supply would de-energize the solenoid actuating means thus allowing the valve to close. Such a valve would also provide safety during other operational mishaps, such as the reverse flow of gasoline. By means, to be described hereinafter, arranged in the circuitry of the control valve, a reverse flow of gasoline or an increase in pressure is sensed and at a desired point the circuit of the control valve is interrupted whereupon the valve automatically closes. While the drawing depicts the preferred electrically operated system, it is understood that a hydarulic system alone or a combination electric hydraulic system may be employed.

A vacuum actuated safety switch 4 is provided between the eductor Y and the fluid control valve 3. Such a switch may comprise a common type of diaphragm operated electric switch. The diaphragm side 4b would be connected in the piping 10 while the electric switch 4a would be wired in series in the control circuit 8 of the fluid control valve 3. As vacuum on the system increases the switch closes the circuit at a desired pressure. Experience has indicated that this pressure should be in the range of 2 to 10 inches of water vacuum. Correspondingly, as the vacuum decreased, the switch would open thereby interrupting the circuit 8 of the control valve. This arrangement provides safety against operational mishaps, such as the reverse flow of gasoline discussed supra. A more general statement of the basic purpose of this switch is to protect the system against a loss of vacuum induced by the eductor which may occur, i.e., should the circulation pump, X, cut out; the eductor, Y, become plugged; or shut off of the circulating motor fuel.

There are many refinements that may be added to the system for operating convenience.

For example, an alarm 11 is included in the preferred embodiment of the invention for signalling any interruption of blending operations. As shown in the drawing, the alarm would be actuated by the amplifier and relay means via circuit 9.

Each component of the system is designed and arranged so as to achieve a fail-safe operating relationship with other components. Besides the inherent safety provided by the vacuum actuated safety switch it is seen that the system is designed to automatically terminate blending operations upon the malfunctioning of any one component. Should the sensing unit fail, i.e., the light bulb burn out, then the fluid control valve will close. A defective photocell would also cause the fluid control valve to close. Either loss of power at the power source or loss of eductor pump power resulting in loss of vacuum will also cause the fluid control valve to close.

It will be understood that the sensing unit 1, amplifier and relay means 2, fluid control valve 3, vacuum switch 4, and measuring means 5 have not been disclosed in greater detail since such components are well known in the art and their individual details form no part of the present invention. Modifications and changes from the specific components as shown in the drawing are within the contemplation of the present invention and are intended to be embraced within the scope of the appended claims.

Having fully described the apparatus of the invention, what is claimed is:

1. In a system for blending fluids comprising a tank; a circulation pump capable of taking suction on said tank; an eductor connected to said pump which discharges therethrough so as to create a vacuum condition at the eductor inlet which is capable of taking suction on a source of fluid to be blended with the contents of said tank; the improvement comprising; measuring means to measure a desired quantity of fluid to be blended with the contents of said tank; sensing means responsive to the operation of said measuring means so as to signify when a predetermined loss of weight is measured; amplifier and relay means to receive, amplify, and relay said signal; fluid control valve means positioned between said eductor and the source of fluid to be blended with the contents of said tank; control circuit means connecting said control valve means with said amplifier and relay means; and vacuum actuated switch means positioned between said eductor and said control valve means and arranged in the control circuit of said control valve means so as to close said control valve means upon a loss of vacuum.

2. In a system for blending a fuel additive in a motor fuel, said system comprising a storage and blending tank for said motor fuel; a circulating pump capable of taking suction on said tank; an eductor through which said pump discharges whereby a vacuum is created in said eductor; means containing a source of fuel additive arranged in piping relationship with said eductor whereby said eductor is capable of taking suction on said fuel additive and convey it into intimate contact with said motor fuel discharging through said eductor so as to form a blend thereof which is then returned to said storage and blending tank; the improvement providing fail-safe operation comprising in combination; measuring means ararnged relative to said means containing a source of fuel additive whereby the amount of fuel additive being blended with said motor fuel may be constantly measured; said measuring means further comprising adjustable means to indicate the loss of a desired predetermined amount of fuel additive; sensing means responsive to said adjustable means to signal when the desired predetermined loss of fuel additive occurs; amplifier and relay means to receive, amplify, and relay said signal; fluid control valve means positioned between said source of fuel additive and said eductor, capable of interrupting flow therebetween upon a signal from said amplifier and relay means in response to the signal from said sensing means; said valve means further comprising actuating means requiring a signal input for opening; control circuit means connecting said amplifier and relay means to said control valve means; and a vacuum actuated safety switch positioned between said fluid control valve and said eductor and connected in series in the control circuit means of said control valve means whereupon a loss of vacuum will close said control valve means.

3. In a system for blending a fuel additive in a motor fuel, said system comprising a storage and blending tank for said motor fuel; a circulating pump capable of taking suction on said tank; an eductor through which said pump discharges whereby a vacuum is created in said eductor; means containing a source of fuel additive arranged in piping relationship with said eductor whereby said eductor is capable of taking suction on said fuel additive and convey it into intimate contact with said motor fuel discharging through said eductor so as to form a blend thereof which is then returned to said storage and blending tank; the improvement providing fail-safe operation comprising in combination; weight measuring means capable of constantly measuring said source of fuel additive; said weight measuring means further comprising a counterweight mounted so as to move in an arcuate path; photo electric cell means positioned so as to be interrupted by said counterweight when a desired predetermined amount of said fuel additive compound is removed from said weight measuring means; amplifier and relay means capable of detecting interruption of said photo electric cell; fluid control valve means positioned between said source of fuel additive and said eductor; control circuit means connecting said control valve means to said amplifier and relay means; said control valve means further comprising actuating means requiring an input signal to open from said amplifier and relay means operating in response to said photo electric cell means; a vacuum actuated switch positioned between said fluid control valve and said eductor and connected in series in the control circuit means of said control valve means whereupon a loss of vacuum will interrupt the control circuit means of said control valve means and cause it to close.

No references cited.